US008448023B2

(12) United States Patent
James et al.

(10) Patent No.: US 8,448,023 B2
(45) Date of Patent: May 21, 2013

(54) APPROACH FOR DATA INTEGRITY IN AN EMBEDDED DEVICE ENVIRONMENT

(75) Inventors: Owen Michael James, Richmond, VA (US); Daniel Giorgis, Glen Allen, VA (US); John Sublett, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 382 days.

(21) Appl. No.: 12/771,819

(22) Filed: Apr. 30, 2010

(65) Prior Publication Data

US 2011/0271144 A1 Nov. 3, 2011

(51) Int. Cl.
*G06F 11/00* (2006.01)

(52) U.S. Cl.
USPC .............................................. 714/22; 714/14

(58) Field of Classification Search
USPC ...................................................... 714/22, 14
See application file for complete search history.

(56) References Cited

U.S. PATENT DOCUMENTS

| | | | | |
|---|---|---|---|---|
| 5,889,933 A * | 3/1999 | Smith | | 714/22 |
| 5,964,836 A | 10/1999 | Rowe et al. | | |
| 5,977,750 A * | 11/1999 | Ng et al. | | 320/132 |
| 6,182,129 B1 | 1/2001 | Rowe et al. | | |
| 6,430,564 B1 | 8/2002 | Judge et al. | | |
| 6,584,612 B1 | 6/2003 | Mueller et al. | | |
| 6,791,473 B2 | 9/2004 | Kibria et al. | | |
| 7,182,250 B2 | 2/2007 | Kelly et al. | | |
| 7,239,409 B2 | 7/2007 | Parry | | |
| 7,430,583 B2 | 9/2008 | Bodin et al. | | |
| 7,506,099 B2 * | 3/2009 | Iwanari et al. | | 711/104 |
| 7,548,946 B1 | 6/2009 | Saulpaugh et al. | | |
| 7,580,990 B1 | 8/2009 | Spring | | |
| 7,647,392 B2 | 1/2010 | Sharma et al. | | |
| 7,734,749 B2 | 6/2010 | Sharma et al. | | |
| 8,129,947 B2 * | 3/2012 | Chiasson et al. | | 320/132 |
| 2001/0049749 A1 * | 12/2001 | Katsuragi et al. | | 709/248 |
| 2003/0147269 A1 * | 8/2003 | Nishihara | | 365/145 |
| 2005/0182991 A1 * | 8/2005 | Kawakubo | | 714/54 |
| 2005/0240813 A1 * | 10/2005 | Okada et al. | | 714/14 |
| 2006/0242458 A1 * | 10/2006 | Feldman et al. | | 714/14 |
| 2006/0288057 A1 * | 12/2006 | Collins et al. | | 707/204 |
| 2007/0027936 A1 * | 2/2007 | Stakutis et al. | | 707/204 |
| 2007/0033433 A1 * | 2/2007 | Pecone et al. | | 714/6 |
| 2007/0061507 A1 * | 3/2007 | Iwanari et al. | | 711/107 |
| 2008/0010549 A1 * | 1/2008 | Coolidge et al. | | 714/44 |
| 2008/0040598 A1 * | 2/2008 | Lee et al. | | 713/2 |
| 2008/0275923 A1 * | 11/2008 | Haselton et al. | | 707/204 |
| 2009/0015204 A1 * | 1/2009 | Rosenwald et al. | | 320/134 |
| 2009/0195211 A1 * | 8/2009 | Wang et al. | | 320/136 |
| 2010/0180065 A1 * | 7/2010 | Cherian et al. | | 711/103 |
| 2010/0274772 A1 * | 10/2010 | Samuels | | 707/693 |
| 2011/0016260 A1 * | 1/2011 | Lomelino et al. | | 711/103 |
| 2011/0260695 A1 * | 10/2011 | Gunderson | | 320/166 |

* cited by examiner

*Primary Examiner* — Loan L. T. Truong
(74) *Attorney, Agent, or Firm* — Seager Tufte & Wickhem LLC.

(57) ABSTRACT

A system for providing data integrity in an embedded device environment. One approach is operating an embedded control engine with non-battery backup power and providing data backup with inexpensive memory. Just data having changes may be provided to a volatile memory such as an SRAM module. After an accumulation of a certain amount of data, the data may be moved onto a relatively larger non-volatile memory, such as an NVRAM module or other type of flash memory. Non-battery backup power may maintain the SRAM module for a period after a power loss, so as to retain data. After restoration of power, data from NVRAM and SRAM modules may be read by the backup service to recreate the last known state of the control engine before the power loss.

22 Claims, 13 Drawing Sheets

APPROACH FOR DATA INTEGRITY IN AN EMBEDDED DEVICE ENVIRONMENT

BACKGROUND

The invention pertains to devices subject to a power interruption and particularly to backup of data prior to a power loss. Also, the invention pertains to reconstruction upon power restoration of a last known state of the devices before the power loss.

SUMMARY

The invention is a system for providing data integrity in an embedded device environment. One approach is to operate an embedded control engine with a non-battery based power backup and provide data backup with an inexpensive memory device. After an accumulation of a certain amount of data, the data may be moved on to a relatively larger non-volatile memory, or other flash memory. There must be non-battery power for maintaining an SRAM module for a period after a loss of power. After restoration of power, data from NVRAM and SRAM modules may be read by the backup service to recreate the last known state of the control engine before power was lost.

DESCRIPTION

Figure 1:
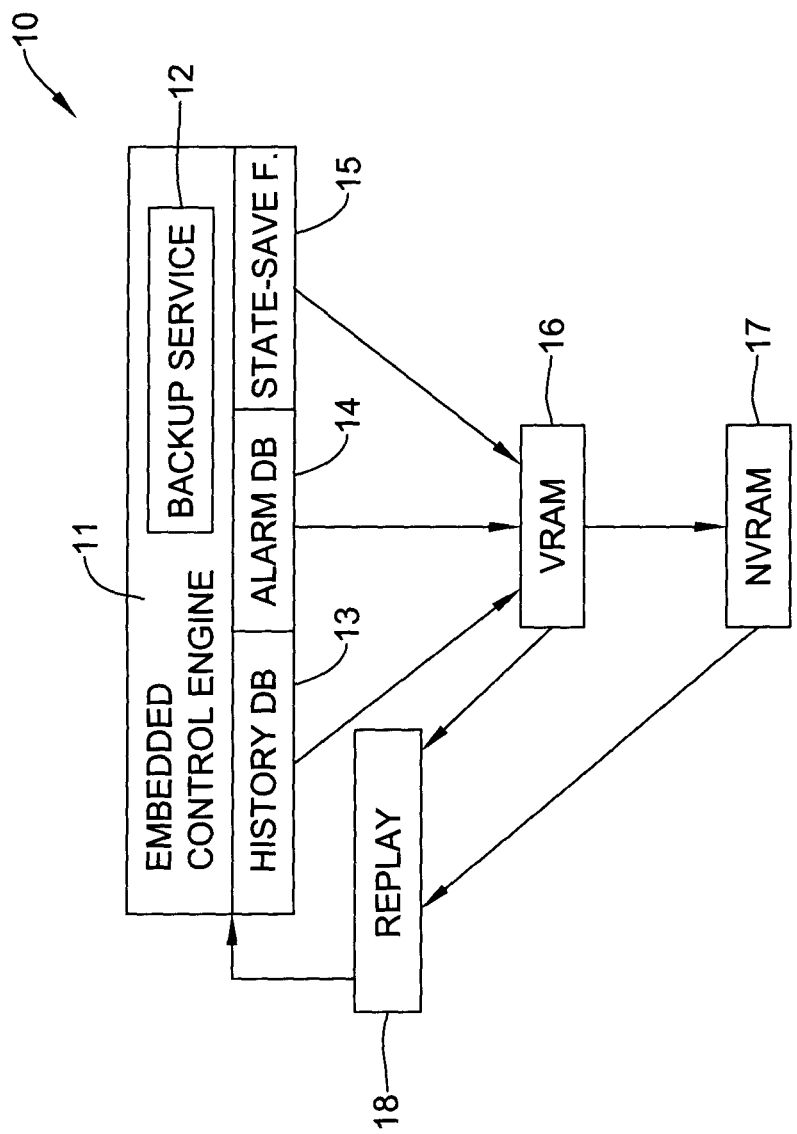
FIG. 1 is a diagram of a data backup system for a power interrupt of an embedded control engine arrangement.

The present approach may solve a commercial need for operating embedded control engines without a battery based backup in a cost effective manner and the technical need for a means to backup large amounts of data with a disproportionably small amount of static memory in an embedded device.

Embedded devices, particularly Java Application Control Engines (JACEs), may require rechargeable batteries as a backup supply of power when primary DC power is lost. This secondary power source may provide enough time for software applications active on the JACE to complete standard shutdown procedures and save applicable runtime data to flash-based storage. Obtaining these batteries can be a costly, time consuming, and ultimately wasteful process. As such, the present approach may remove the secondary power component of the embedded devices and replace it with a software and storage based solution that mirrors the batteries' primary function of saving valuable runtime data.

An obvious consequence of removing these batteries from the devices appears to be that once primary power is lost, the device and its software cease to function. Under a more deterministic environment, a solution might be to raise an interrupt upon power loss to use what little time remains to save important data. However, as the data in question resides in a non-deterministic virtual machine, such a solution is not necessarily possible. This loss of power issue may require an alternative solution to save runtime data as it is being generated, not—as with a battery or interrupt based backup—after power is lost. This restriction may imply that all applicable data points are immediately written to non-volatile RAM (NVRAM—a term which may be used synonymously with flash memory) upon a value change. When primary power is lost with this strategy, the last known values for all applicable points may be safely retained and available in storage when power is returned.

While a flash memory may retain all information written, even after power is lost, the increased number of write operations resulting from a conventional backup implementation can eventually damage the memory. In addition to this, the latency associated with writing to flash memory appears significant; a solution consisting of only a flash memory can not guarantee that value changes persist if power is lost, or in a timely fashion. These drawbacks may be resolved by substituting the role of flash in this backup strategy with static random access memory (SRAM).

An SRAM module (SRAM) does not necessarily suffer the writes over time penalty, or the write latency, associated with a flash memory; moreover, when paired with an appropriately sized capacitor, it demonstrates non-volatile behavior. These properties appear to make SRAM an excellent candidate for both existing in a powerless environment and acting as the persistent medium of a volatile set of data. SRAM, however, may be expensive and as such cannot completely replace the significantly cheaper flash in a cost effective manner. The present approach may solve this problem by combining the beneficial properties of SRAM (speed, integrity) with those of flash (low cost) by using SRAM as an external buffer or cache.

The present approach may solve the previously noted issues by creating a hybrid storage medium consisting of SRAM and flash in a cost effective manner. In conjunction with this new storage, the present approach may introduce a software algorithm capable of automatically backing up large amounts of volatile data that does not interfere with the normal operation of the embedded control engine. There may be several features of the present approach, which when combined together, make it a unique approach to a backup and storage design.

Without batteries, runtime data should be saved synchronously at the time a change occurs, not at a later scheduled time. Common backup solutions may center on intervals, where data is saved every hours/days. To understand what makes such a policy unacceptable, one may consider the following: 1) An operator changes a thermostat point from 65 to 68; 2) Dependent points register the point change from 65 to 68; 3) Asynchronous data backup for point is scheduled; 4) Power is lost and thus the scheduled backup is lost; 5) Power is restored; and 6) The point is initialized to 65.

The loss of the operator's change once power is restored needs to be prevented. How the present approach mitigates the problem may be demonstrated by the following: 1) An operator changes a thermostat point from 65 to 68; 2) Synchronous data backup for point takes place; 3) Dependent points register point change from 65 to 68; 4) Power is lost and restored; and 5) The point initialized to 68. The third and second steps, respectively, distinguish the two approaches.

In addition to this strategy, the present approach may minimize the amount of storage required for backup by only creating records for a data point within a set that has actually changed, not the entire set of data points. Redundancy may result from making backups for a point that has not changed; therefore, the present approach may only track a change or changes to a point from a set of data points as it relates to the set's original state (commonly called deltas). Saving data in this manner may allow for the present approach to backup a large set of data in a disproportionably small amount of memory space.

The number of write operations performed on an NVRAM module (NVRAM), and the speed at which those write operations can be persisted, may impose a further restriction upon an embedded environment backup solution. If a targeted set contains volatile data, then the number of write operations necessary to backup that data may quickly overwhelm the capabilities of the persistent storage. The present approach may pair a capacitor-backed SRAM (which does not impose a writes/time restriction) and NVRAM to minimize the number of writes performed on the latter.

Although the SRAM module exhibits ideal properties for acting as a backup medium, replacing the NVRAM module with the SRAM module completely is not necessarily a cost effective solution. An SRAM module, compared to a similar sized module of NVRAM, may be much more expensive. The cost per megabyte, therefore, may be regarded as the primary reason for the inclusion of the NVRAM module. The present approach may control the cost of battery-less operation by including a large amount of inexpensive NVRAM with a small amount of SRAM. In practice, SRAM modules as small as 1024 Kbytes may effectively back up data in the order of multiple megabytes.

An SRAM may act as a cache residing in front of the NVRAM. Write operations from backing up individual data points may be directed to the SRAM, not the NVRAM. These writes may proceed until the engine determines that the SRAM is full, at which time the entirety of the SRAM is written, in one operation, to the NVRAM. The caching of data in this smaller SRAM may make the present approach cost effective, significantly reduce or eliminate the number of writes performed on NVRAM, and reduce latency experienced by the control engine.

A further feature created by this pairing may be how the data remanence properties of SRAM are exploited. Since the cache may contain the most recent changes to the data set, it is critical to maintain its contents when power is lost. Caches in software may typically be provided by a dynamic random access memory (DRAM), which does not necessarily retain data when power is lost. The present approach may use SRAM so that the data contents of both the cache and NVRAM can be used to reconstruct the control engine's last known state.

The present approach may be reduced to practice within the Niagara Framework, a Java based application framework developed by Tridium, Inc. The items which may be used include a PPC (Power PC) JACE with an option card slot and NAND flash, and an option card with a 5.5V/1.0 F capacitor and 1024 Kbytes of SRAM.

The following describes the typical flow of the present backup strategy and outlines some of the thus far discovered practices. This approach may establish a client/server relationship between a set of data points and the backup service, respectively.

The initial values of the control engine and its data may be defined by a state-save file known in the Niagara Framework as a "config.bog". During runtime, modifications may occur to non-transient data points that require the creation of a new save file. If power loss occurs before the creation of this file, the changes may be lost and the control engine will be reinitialized to that of its previous startup state. To prevent this loss from occurring, the present approach may be introduced to record the changes of each persistent value.

A backup service may preside over the SRAM, which in turn acts as the cache for the NVRAM. Clients of this service may provide it with data that requires backup. Clients of the service have no knowledge of how this data will be stored—only that it will be available again after a power loss.

If a power cycle occurs (i.e., power loss and restoration), the backup service may be responsible for reading all data stored in both NVRAM and SRAM, reassembling it, and making it available for the client. The client may then be responsible for interrogating the service and accepting any data provided. These changes, merged with the save file from the previous startup, may recreate the last known state of the control engine before power was lost.

Internally, the backup service may use varied techniques to improve service availability, reduce data redundancy, and reconstruct runtime data once power is restored, which collectively can contribute to a novelty of the present strategy.

Service availability may be improved by creating not just a single cache object within SRAM, but several. With a single SRAM block, the backup service may be unavailable for a period of time while the contents of the block are flushed to NVRAM—this could be harmful to the performance of the control engine as all writes to SRAM must be synchronous. However, by using partitioning the SRAM into logical blocks, an idle block may be swapped in to replace the block currently being flushed (on a separate execution thread), thus providing uninterrupted service to clients.

Data redundancy may be reduced by recognizing and overwriting multiple state changes from the same data point. If a data point changes state for the first time, it may be represented in the SRAM cache by a new record. If the data point changes again, and the same block of the SRAM cache is active (i.e., it has not been swapped out from the previous technique described), then it may be redundant to create an additional record. Storage space may be saved by updating the value of the old record to reflect the new state transition. Since a goal of the present approach is to recreate the last known state of the control engine, state changes between the initial and end values may be irrelevant.

It may be the responsibility of the backup service to be able to reassemble all recorded points to the last known value if power is lost. To facilitate this responsibility, all data saved in flash may be tagged with a monotonically sequenced timestamp (recorded as a filename) that reflects the time at which the file was created. Using this as a metric, flash files may be "replayed" (tracking value changes as they occurred), with the cache replayed last, in order to recreate the last known state from the data points.

FIG. 1 is a diagram of a data backup system 10 for a power interrupt of an embedded control engine arrangement. System 10 may have an embedded control engine 11 and a backup service 12. Engine 11 may have a history database 13, an alarm database 14 and a state-save file 15. Data may be provided to a NVRAM 16 from the history 13 and alarm 14 databases, and the state-save file 15. From VRAM 16, the data may be provided to a NVRAM 17. When restoring after a power interruption, data may be conveyed to the backup service 12 and control engine 11 via a replay module 18 where the backup data from the VRAM 16 and NVRAM 17 are arranged to create the last known state of the control engine before the power interruption.

Figure 2:
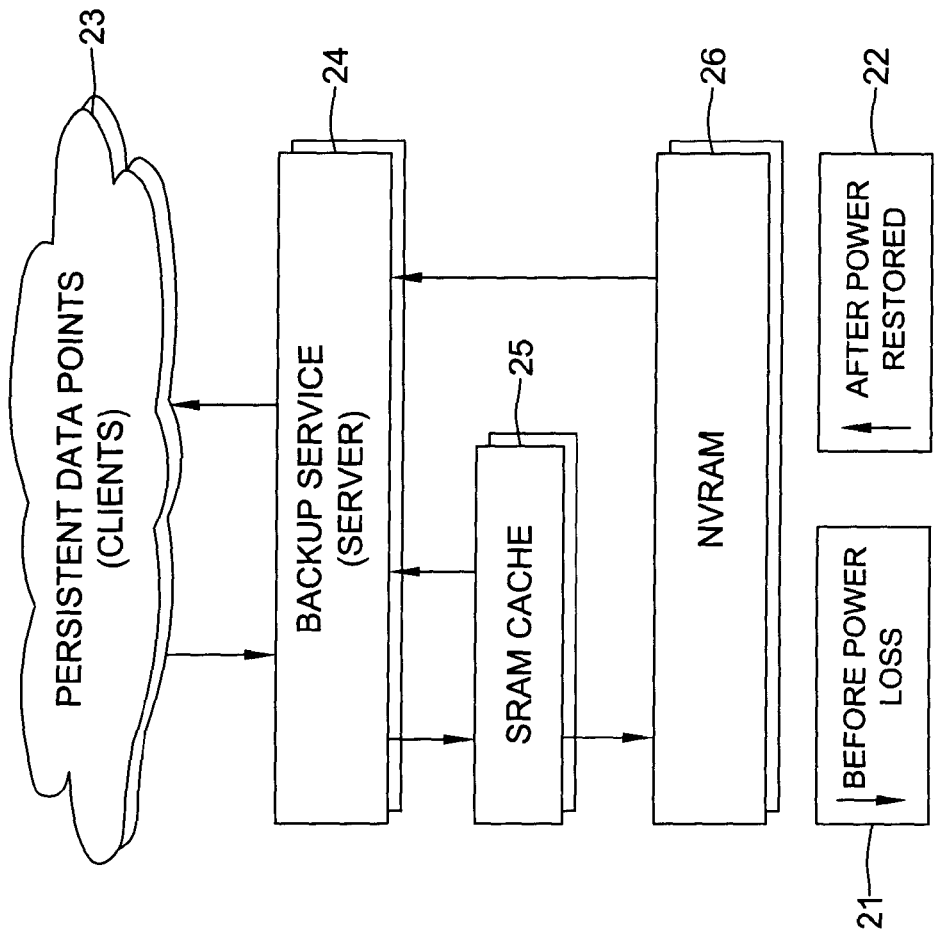
FIG. 2 is a diagram of a layout applicable to data transfer before a power loss and after a power restoration.

FIG. 2 is a diagram of a layout applicable to data transfer before a power loss 21 and after power is restored 22. Before power loss 21, persistent data points (clients) 23 may go to a backup service 24. If there is a change in a data point, the point may be stored in an SRAM cache 25. Once cache 25 has stored a certain amount of data, then the data may be flushed from SRAM 25 to an NVRAM 26. After a power loss 21 and a restoration 22 of power, the stored data may be read from NVRAM 26 and SRAM cache 25 by the backup service 24 to reconstruct the last state known before the power loss 21. The reconstructed state may be provided from the backup service 24 to the clients 23.

Figure 3:
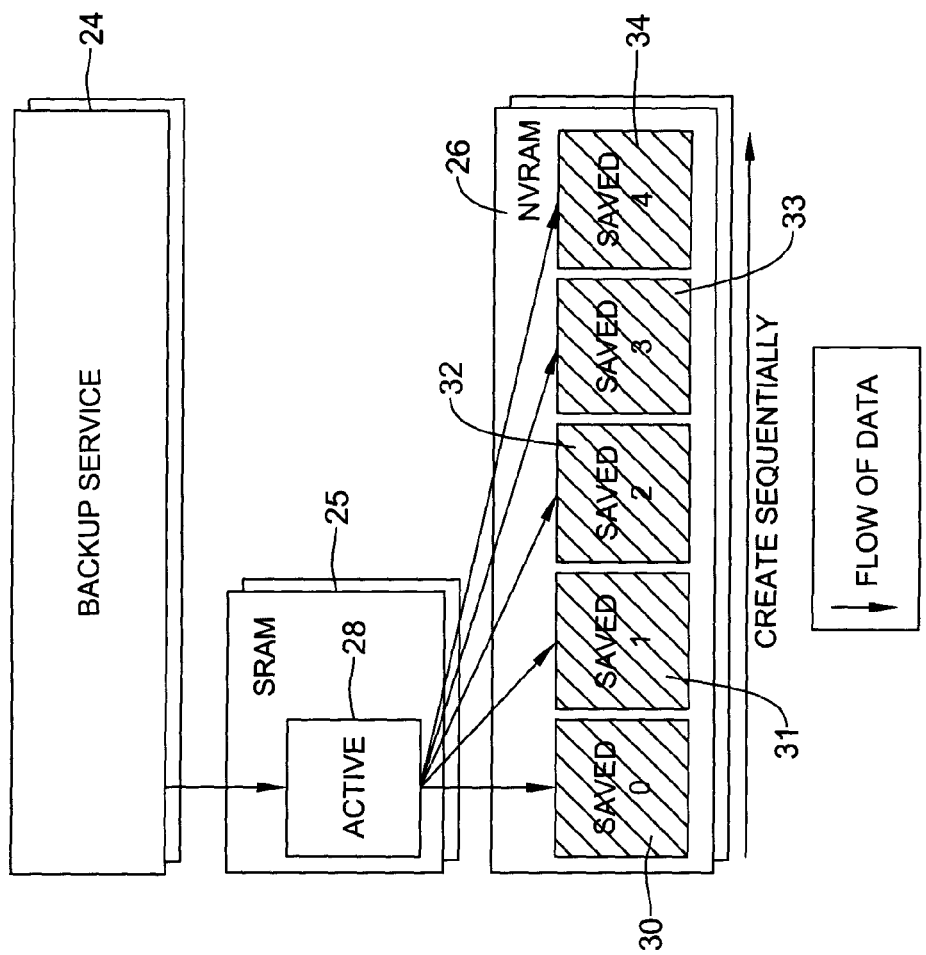
FIGS. 3 and 4 are diagrams of a scheme for saving data before a power loss and a retrieval of data after power restoration.
Figure 4:
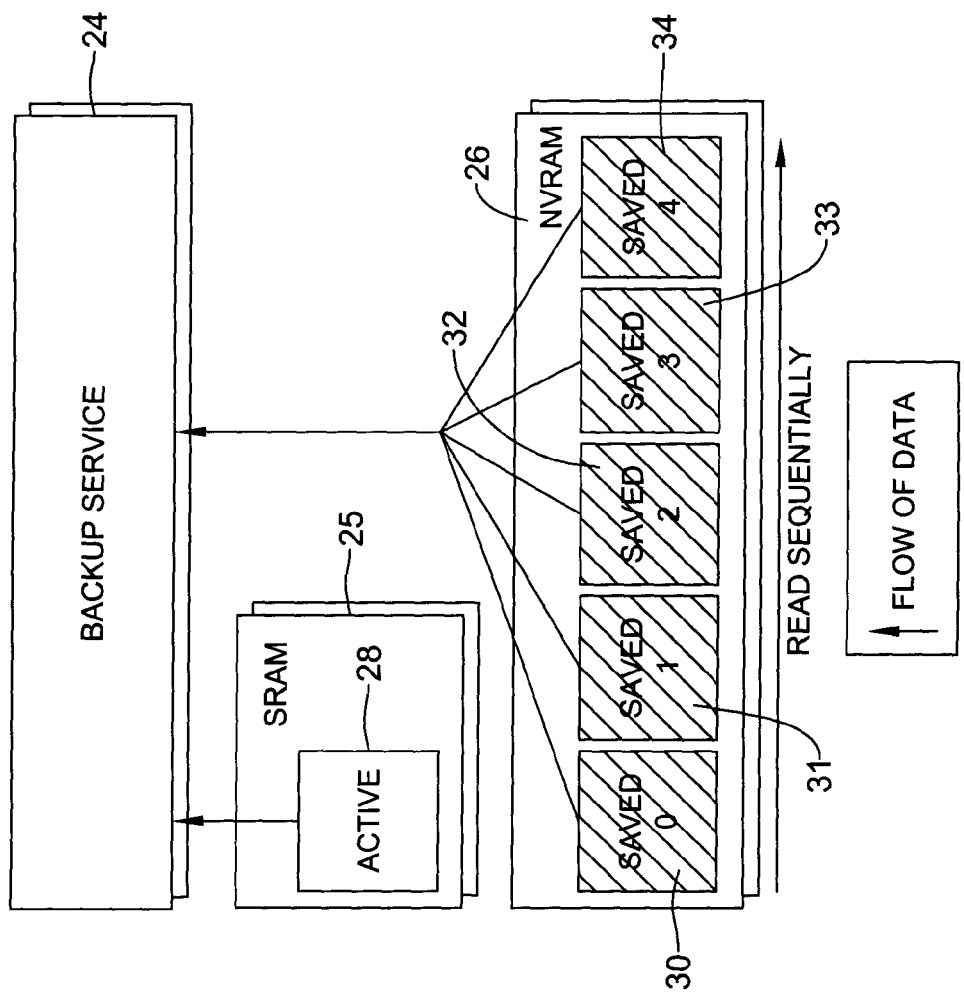

FIGS. 3 and 4 are diagrams of another scheme of saving data before a power loss and a reading of the data after power restoration. Before a power loss, changed data may go from backup service 24 to an active block 28 in SRAM 25. When block 28 becomes full, the data may be flushed from block 28 to a save block 30 in NVRAM 26. Subsequent fills of active block 28 may be flushed from block 28 to save blocks 31, 32, 33, 34, and so on, respectively, of NVRAM 26. Save blocks 30-34, and so on, may be created sequentially. After a power restoration, the saved data may be read sequentially from the save blocks 30-34, and so on, by backup service 24. Also, data in active block 28 of SRAM 25 may be read by backup service 24. The order of in which the data was stored may aid in a reconstruction of the last known state of the control engine prior to power loss.

Figure 5:
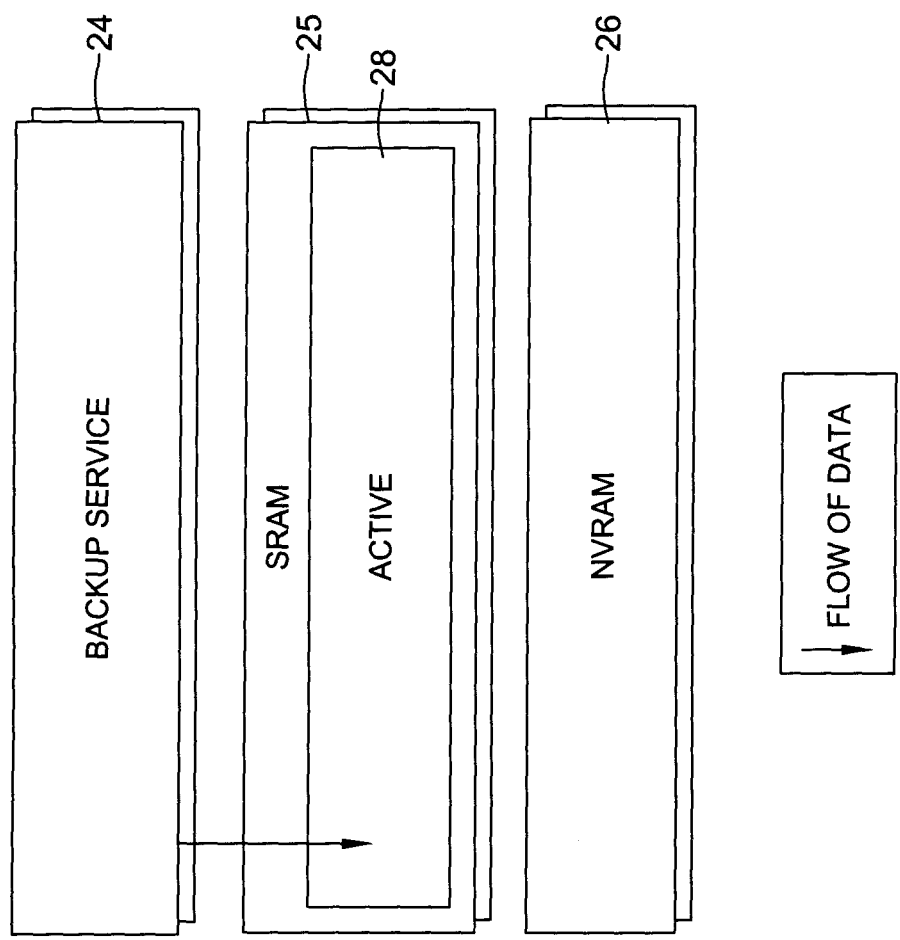
FIGS. 5, 6 and 7 are diagrams of steps for a flow of data prior to a power loss.
Figure 6:
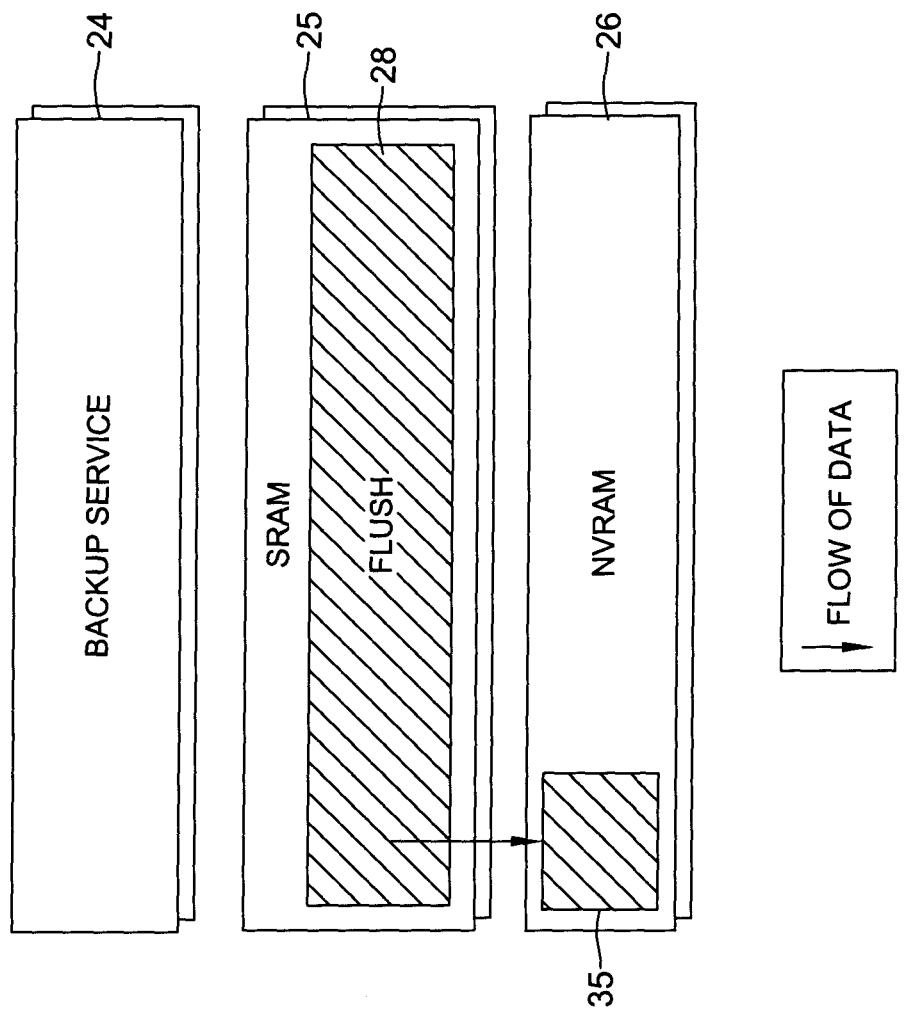
Figure 7:
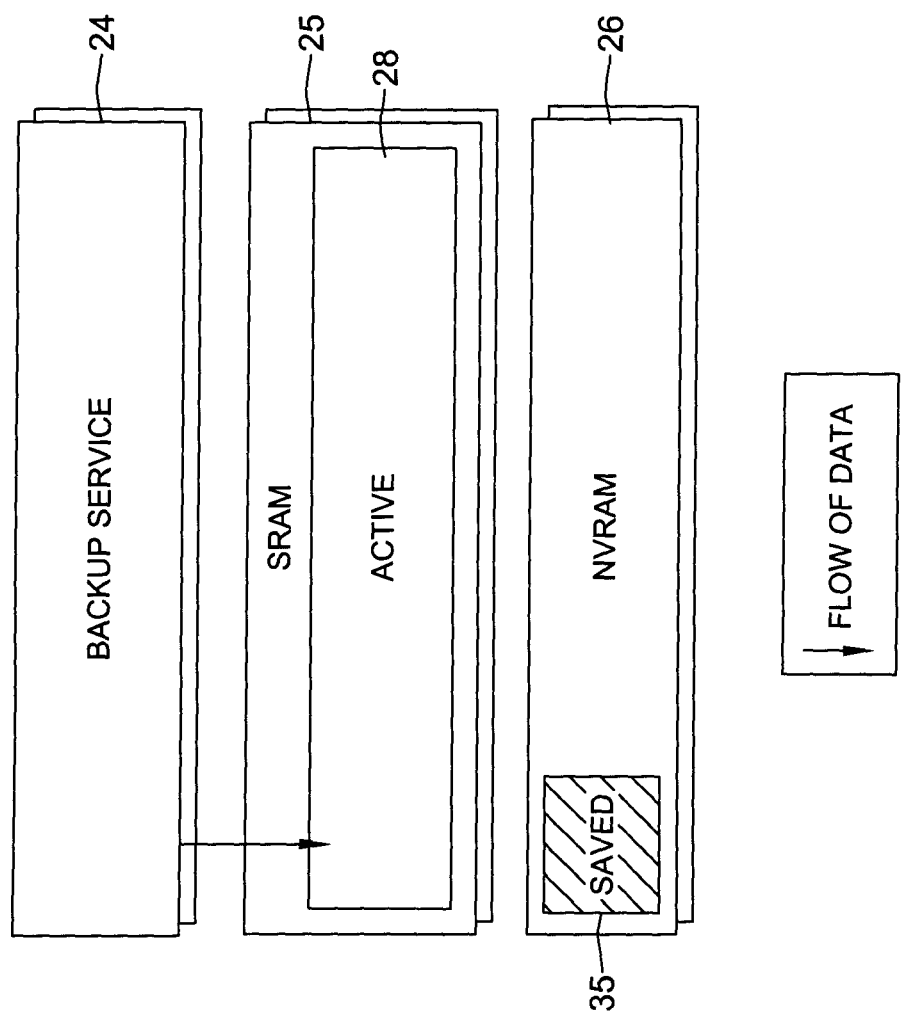

FIGS. 5, 6 and 7 are diagrams of steps of a flow of data prior to a power loss. In FIG. 5, data with a change may be input to an active block 28 of SRAM 25. In FIG. 6, the data in block 28 may be flushed out to a block 35 in NVRAM 26.

FIG. 7 shows the data from block 28 to be saved in block 35 of NVRAM 26. At this point, backup service 24 may again provide data that has changed to active block 28. During the flush of active block 28, backup service 24 would not necessarily be able to enter data in block 28. Upon completion of the flush, block 28 may become active and backup service 24 can provide data that has changed to block 28.

Figure 8:
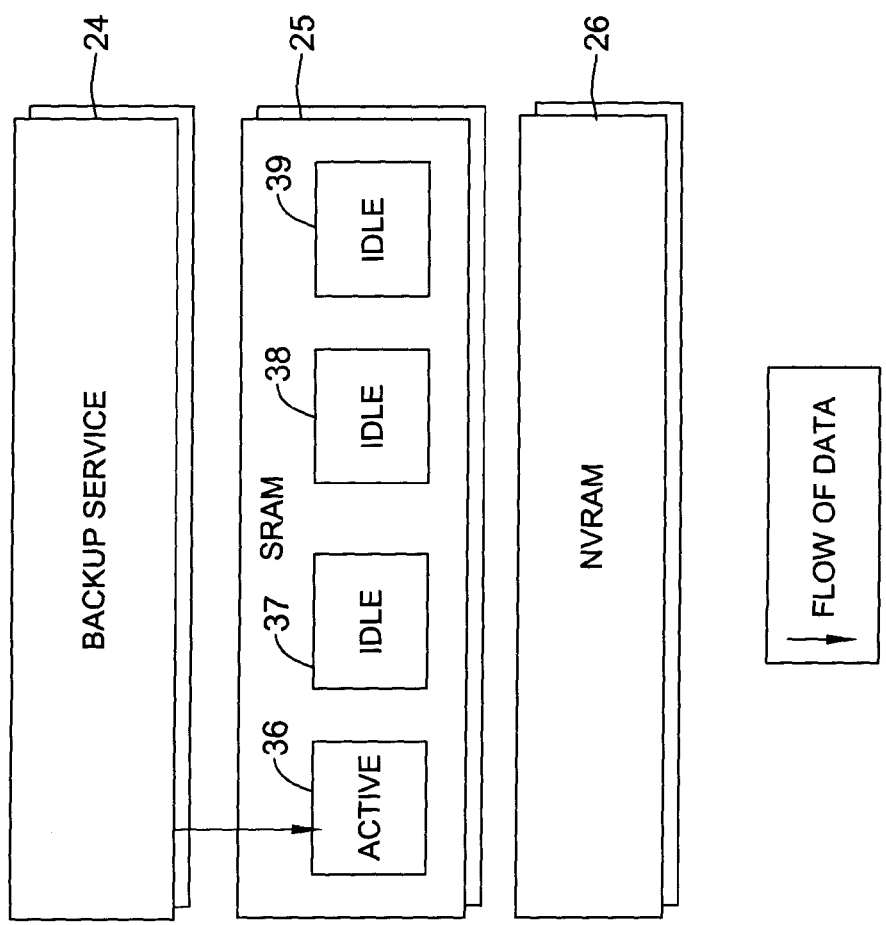
FIGS. 8, 9 and 10 are diagrams which remedy an issue of data not being able to be put in a cache during the period of a flush of data from the cache to another memory.
Figure 9:
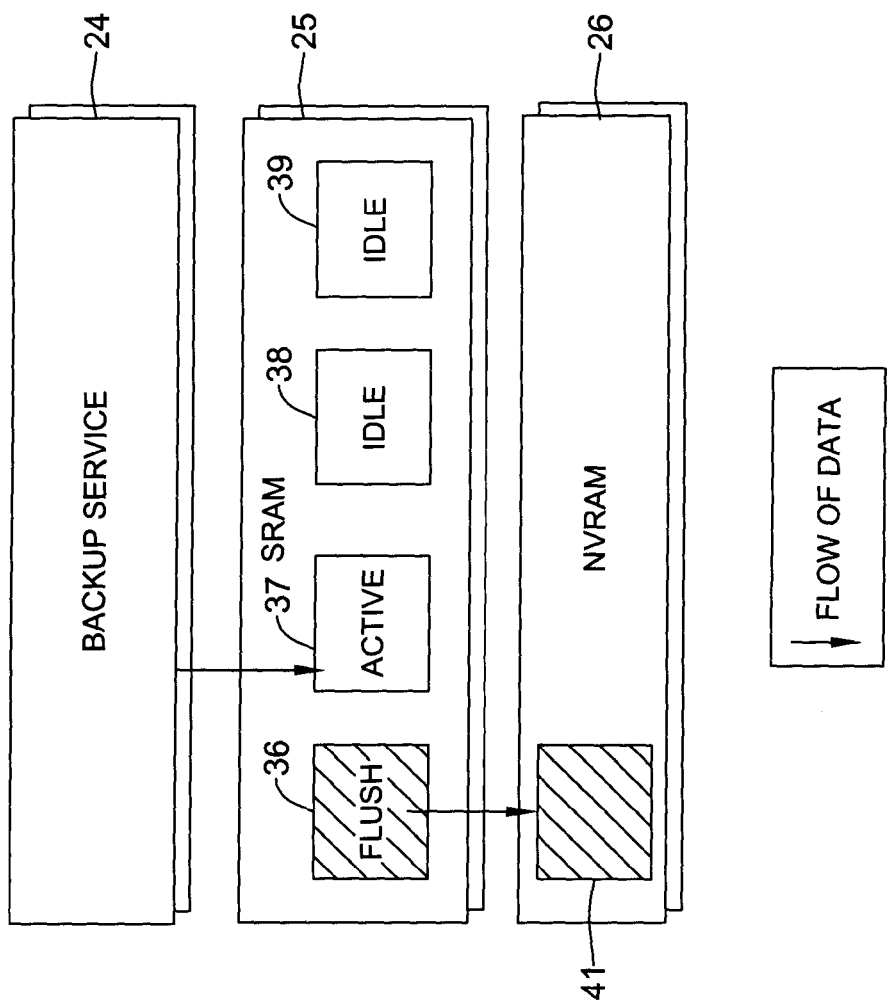
Figure 10:
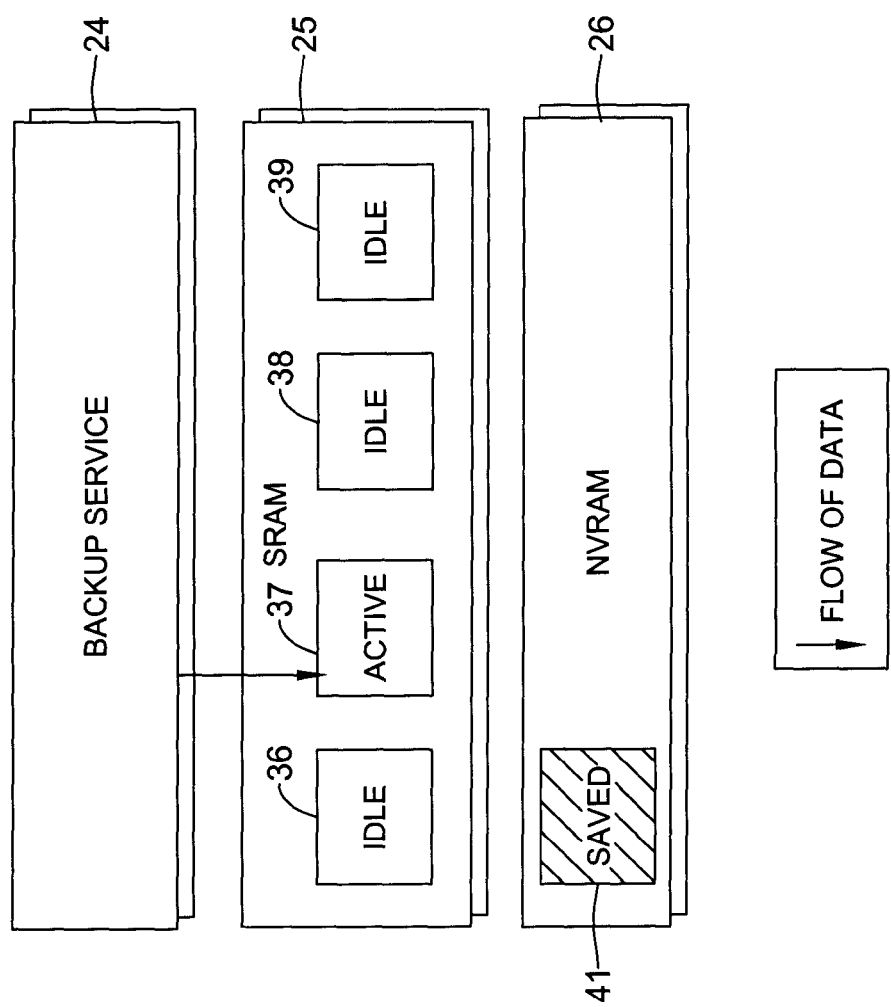

FIGS. 8, 9 and 10 are diagrams which remedy an issue of data not being able to be put in SRAM 25 during a flush of active block 28 which means that, for a short period of time, data with changes could possibly be lost if there were a power loss during the flush operation. FIG. 8 shows data going from backup service 24 to an active block 36 of SRAM 25. SRAM 25 may have idle blocks 37, 38 and 39. FIG. 9 shows the data of block 36 being flushed out to a block 41 of NVRAM 26 to be saved. During the flush, idle block 37 may become active and data may continue to flow from backup service 24 to active block 37. In FIG. 10, data flushed from block 36 is saved in block 41 of NVRAM 26. Once flushed, block 36 may become idle and block 37 may continue to be active and receive data from backup service 24.

Figure 11:
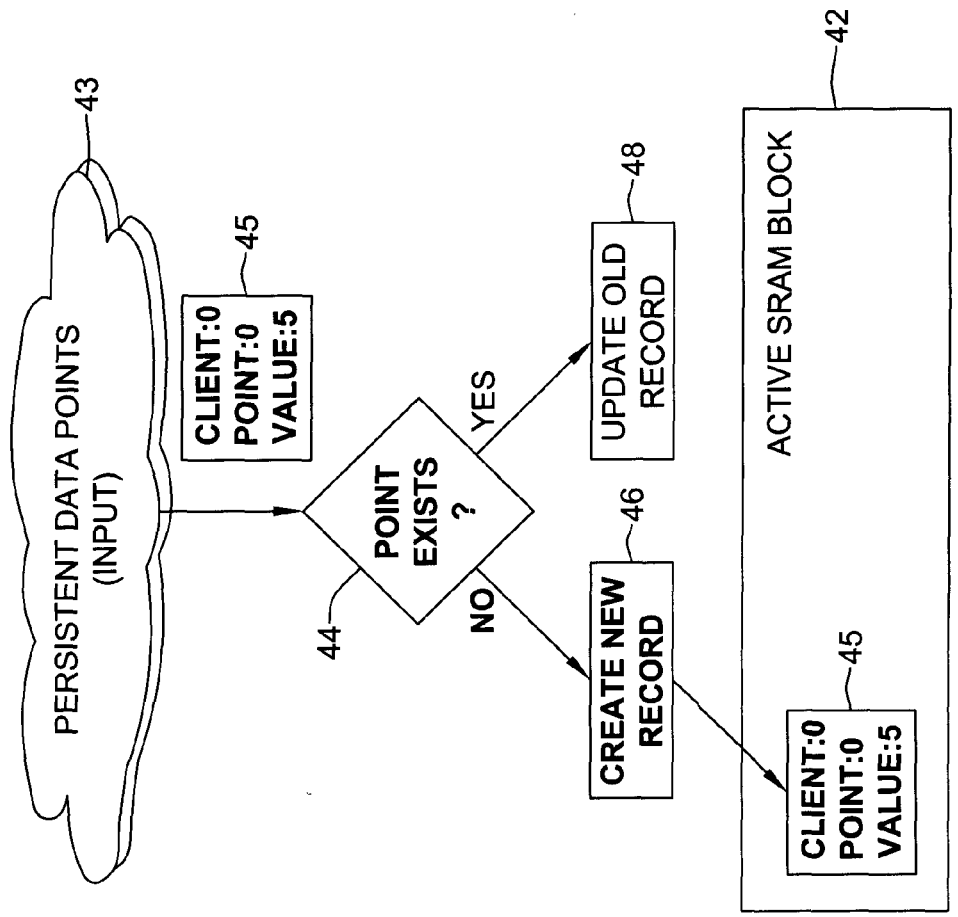
FIGS. 11, 12 and 13 are diagrams which show a reduction of redundant data saving to a cache.
Figure 12:
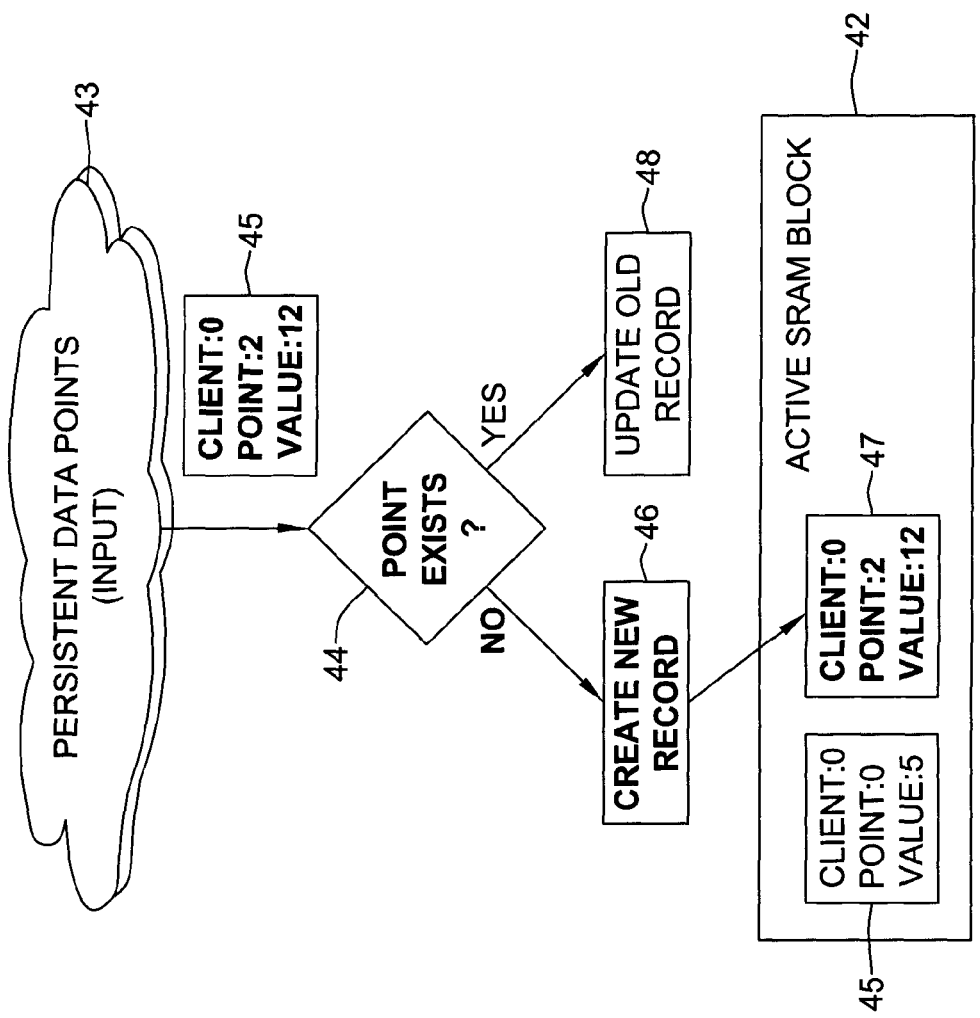
Figure 13:
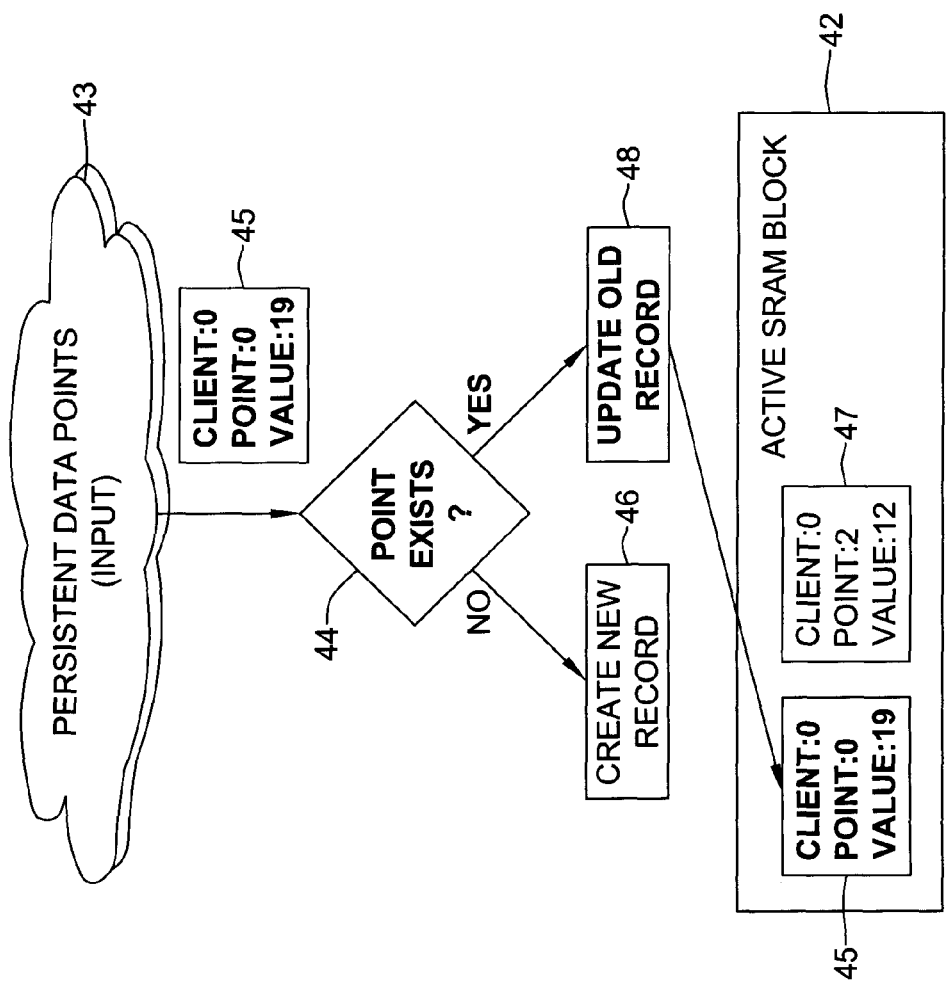

FIGS. 11, 12 and 13 are diagrams which show a reduction of redundant data saving. In FIG. 11, persistent data points (input) source 43 may provide a data point 45 labeled as client 0, point 0 with a value 5. A question at symbol 44 may ask whether point 45 exists in an active SRAM block 42. If the answer is no, then a new record of point 45 may be created at symbol 46 to be stored in active SRAM block 42.

FIG. 12 is a diagram showing another data point 47 from data points source 43 labeled as client 0, point 2 with a value of 12. A question at symbol 44 may ask whether point 47 exists in the active SRAM block 42. If the answer is no, then a new record of point 47 may be created at symbol 46 to be stored in active SRAM block 42.

FIG. 13 is a diagram showing the data point 45 having a change in value. The data point 45 from source 43 is labeled as client 0, point 0 with a value 19. A question at symbol 44 may ask whether point 45 exists in the active SRAM block 42. If the answer is yes, then the old record of point 45 may be updated at symbol 48 resulting in a change of value from 5 to 19 for point 45 as stored in the active SRAM block 42.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A data backup approach for an embedded device upon loss of power without a battery backup, comprising:
   a device having:
      runtime data;
      a backup service running on the device;
      a volatile memory cache available to the backup service;
      a non-volatile memory available to the volatile memory cache; and
      a non-battery backup power source connected to the volatile memory cache; and
   wherein:
   changed runtime data of the device are saved synchronously from the backup service to the volatile memory cache at the time the runtime data incur one or more changes;
   the data with one or more changes are moved as a block from the specified portion of the volatile memory cache to the non-volatile memory;
   upon a loss of primary power, data in the volatile memory cache are retained in the volatile memory cache using the non-battery backup power source; and
   upon return of primary power, the data are read from the non-volatile memory and the volatile memory cache by the backup service.

2. The system of claim 1, wherein upon return of primary power, the backup service reads data from the volatile memory and non-volatile memory and provides reassembled data.

3. The system of claim 2, wherein the reassembled data is for recreating a last known state of the device before a loss of primary power.

4. The system of claim 1, wherein:
   the volatile memory cache is an SRAM module; and
   the non-volatile memory is an NVRAM module.

5. The system of claim 4, wherein:
   the SRAM module is partitioned into two or more blocks;
   a first block of data can be flushed to the NVRAM module; and
   a second block may be swapped in place of the first block for receiving data from the backup service while the first block of data is being flushed to the NVRAM module.

6. The system of claim 4, wherein:
   if a datum changes value for a first time, the datum is entered in the SRAM module as a new record; and
   if the datum changes value again, then the datum is entered in the SRAM module as an updated or appended record.

7. The system of claim 4, wherein a record is created only for a datum, having a change, of a set of data, for storage in the SRAM module.

8. The system of claim 4, wherein:
   records from data that have one or more changes are writes to the SRAM module;
   the writes proceed until an SRAM block is full; and contents of a full SRAM block are written to the NVRAM module.

9. The system of claim 1, wherein the non-battery backup power source comprises a capacitor.

10. A method for providing data backup of an embedded device for a power interrupt without backup batteries, comprising:
providing a backup service for data points of a device;
saving by the backup service, a data point which has a change of value to a volatile memory cache at the time the data point is changed during operation of the device;
saving the data point from the volatile memory cache to a non-volatile memory cache to a non-volatile memory;
upon a loss of primary power, data points in the volatile memory cache are retained using a non-battery electrical power source;
after a power restoration, reading the data points from the volatile memory cache and the non-volatile memory by the backup service; and
recreating a last known state of the device by the backup service with the data points read from the volatile memory cache and the non-volatile memory upon the power restoration.

11. The method of claim 10, wherein the volatile memory cache comprises an SRAM module.

12. The method of claim 10, wherein the non-volatile memory comprises an NVRAM module.

13. The method of claim 11, wherein the SRAM module is partitioned into two or more blocks.

14. The method of claim 13, wherein:
one or more data points which have changes of values are saved to a first block of the two or more blocks of the SRAM module; and
additional one or more data points are saved to a second block of the two or more blocks of the SRAM module if the one or more data points in the first block are being flushed out to the non-volatile memory.

15. The method of claim 10, wherein:
if a data point has a change of value for a first time, it is saved in the volatile memory cache as a first record; and
if the data point has a change of value for a second time, then the first record is updated with the change of value.

16. The method of claim 10, wherein:
data points having a change of value are saved to the volatile memory cache;
after a certain portion of the volatile memory cache is full, the data points of the volatile memory cache are saved to the non-volatile memory;
each of the data points saved to the non-volatile memory is tagged with a monotonically sequenced counter to reflect a time at which the data point was saved to the non-volatile memory; and
the backup service reads data points from the non-volatile memory and reassembles the data points to a last known state of the device with a facilitation of the monotonically sequenced counter, upon a power restoration.

17. The method of claim 10, wherein a data point storage size of the non-volatile memory is one or more orders of magnitude greater than a data point storage size of the volatile memory cache.

18. A system for data integrity in an embedded device environment, comprising:
an embedded device having persistent data points;
a backup service running on the embedded device;
a volatile memory available to the backup service; and
a non-volatile memory available to the volatile memory; and
wherein:
the volatile memory comprises a cache between the backup service and the non-volatile memory;
when a data point has a change of value, then the data point is saved by the backup service to the volatile memory;
after consuming a certain portion of the volatile memory, the data points are flushed from the volatile memory to the non-volatile memory; and
a non-battery device provides electrical energy to permit the volatile memory to retain data points upon a power loss.

19. The system of claim 18, wherein a data point having a change is synchronously saved to the volatile memory.

20. The system of claim 18, wherein:
the volatile memory comprises two or more blocks; and
while data points are flushed from a first block of the volatile memory to the non-volatile memory, a second cache is available for saving one or more data points from the backup service.

21. An embedded device with data backup capability upon loss of power without a battery backup, the embedded device comprising:
an embedded control engine having data, the embedded control engine including a backup service;
a volatile memory cache available to the backup service, the volatile memory cache having at least two partitions;
a non-volatile memory available to the volatile memory cache and the backup service; and
a non-battery backup power source connected to the volatile memory cache, the non-battery backup power source for providing power to the embedded control engine and/or the volatile memory cache upon a power outage; and
wherein:
the backup service is configured to:
synchronously save data upon a change in value to a first partition of the volatile memory cache;
move data from the first portion of the volatile memory cache to the non-volatile memory when the first portion of the volatile memory cache is full and synchronously save data upon a change in value to a different partition of the volatile memory cache; and
upon a return of primary power after a power loss, read data from the volatile memory cache and the non-volatile memory, wherein the data stored in the volatile memory cache were retained using the non-battery backup power source.

22. The embedded device of claim 21, wherein the backup service restores data of the embedded controller to the last known state before the power loss.

* * * * *